United States Patent
Carpenter et al.

(10) Patent No.: US 11,427,741 B2
(45) Date of Patent: Aug. 30, 2022

(54) CRYOGENIC, KINETICALLY ACTIVE FORMULATIONS AND SYSTEMS FOR THEIR DISPENSING

(71) Applicant: FORMULATED SOLUTIONS, LLC, Largo, FL (US)

(72) Inventors: Michael Carpenter, Palm Harbor, FL (US); Eric Dann, Safety Harbor, FL (US); Thomas Dann, Palm Harbor, FL (US); Renee Nelson, Brandon, FL (US)

(73) Assignee: FORMULATED SOLUTIONS, LLC, Largo, FL (US)

( * ) Notice: Subject to any disclaimer, the term of this patent is extended or adjusted under 35 U.S.C. 154(b) by 0 days.

(21) Appl. No.: 17/271,555

(22) PCT Filed: Aug. 30, 2019

(86) PCT No.: PCT/US2019/049085
§ 371 (c)(1),
(2) Date: Feb. 25, 2021

(87) PCT Pub. No.: WO2020/047423
PCT Pub. Date: Mar. 5, 2020

(65) Prior Publication Data
US 2021/0317355 A1    Oct. 14, 2021

Related U.S. Application Data

(60) Provisional application No. 62/875,564, filed on Jul. 18, 2019, provisional application No. 62/725,696, filed on Aug. 31, 2018.

(51) Int. Cl.
  *C09K 5/04*    (2006.01)
  *B65D 83/62*   (2006.01)
  *F25D 3/10*    (2006.01)

(52) U.S. Cl.
  CPC .............. *C09K 5/045* (2013.01); *B65D 83/62* (2013.01); *F25D 3/10* (2013.01)

(58) Field of Classification Search
  CPC .... A61K 8/046; A61K 2800/87; A61K 8/315; A61K 8/69; B65D 83/62; B65D 83/38; B65D 83/384; B65D 77/067; B65D 77/225; B65D 83/20
  See application file for complete search history.

(56) References Cited

U.S. PATENT DOCUMENTS

| 8,734,671 B2 | 5/2014 | Hulse et al. |
| 2011/0023507 A1 | 2/2011 | Motta et al. |
| 2012/0128964 A1 | 5/2012 | Hulse et al. |
| 2017/0158833 A1 | 6/2017 | Williams et al. |
| 2018/0168948 A1* | 6/2018 | Glenn, Jr. ............... A61Q 5/02 |

FOREIGN PATENT DOCUMENTS

| EP | 1280514 A1 | 2/2003 |
| WO | 2018075864 A1 | 4/2018 |

OTHER PUBLICATIONS

International Application No. PCT/US2019/049085, International Search Report and Written Opinion dated Nov. 13, 2019, 12 pages.
European Application No. 19853900.9, Supplementary European Search Report dated Apr. 25, 2022, 6 pages.

* cited by examiner

*Primary Examiner* — John R Hardee
(74) *Attorney, Agent, or Firm* — Liang & Hennessey LLP; Stanley D. Liang

(57) ABSTRACT

A cryogenic, kinetically active formulation in a pressurized package; the package; and a method of making the formulation and the package.

8 Claims, No Drawings

CRYOGENIC, KINETICALLY ACTIVE FORMULATIONS AND SYSTEMS FOR THEIR DISPENSING

TECHNICAL FIELD

This invention relates to the field of pressurized cryogenic formulations and containment/dispensing systems comprising such a formulation.

BACKGROUND

Many consumer products inside a pressurized can (package or a containment/dispensing system) require shaking the can, sometime quite vigorously, before dispensing. Such shaking is often undesirable and can result in highly variable mixing and inconsistent product experiences. Many such products also would benefit from being intensely cool (cryogenic) upon dispensing.

SUMMARY

This disclosure provides a package (a containment/dispensing system), which may be pressurized, comprising a formulation. This disclosure also provides a cryogenic, kinetically active formulation; the formulation is cryogenic and kinetically active upon dispensing from the package. The package may not require vigorous shaking (or any shaking) before dispensing the formulation from the package. The formulation comprises one or more active agents that is co-mingled (co-processed) with one or more non-flammable and/or flammable liquid refrigerants prior to being filled under pressure into the package. The co-mingling involves mixing at high speed under controlled pressure and temperature. In some embodiments, the one or more liquid refrigerants are added in sufficient amounts to be dispersed in the formulation. In certain embodiments, the package maintains at least a minimal amount of pressure until substantially all the formulation in the package is expelled (i.e., dispensed) as a cryogenic, kinetically active formulation. In certain embodiments, the package maintains at least a minimal amount of pressure to maintain the one or more liquid refrigerants dispersed in the formulation. In certain embodiments, the refrigerant(s) is/are non-flammable. In certain embodiments, one or more non-flammable liquid refrigerants comprise Honeywell Solstice propellant 1234ze and/or Honeywell Solstice performance fluid 1233zd and/or HFC-245FA.

This disclosure provides a method of preparing a cryogenic, kinetically active formulation, comprising:
  controlled mixing at high speed of sufficient amounts of one or more non-flammable refrigerants with a composition comprising one or more active agents under pressure, wherein the pressure and the temperature are carefully controlled during mixing, resulting in a formulation;
  Filling said formulation under pressure into a package;
  wherein said one or more liquid refrigerants are added in sufficient amounts to be dispersed in the formulation and expelling the formulation from the package as a cryogenic, kinetically active formulation;
  wherein said pressurized package is under sufficient pressure to maintain the one or more liquid refrigerants dispersed in the formulation; and wherein said pressurized package is under sufficient pressure to expel said formulation as a cryogenic, kinetically active formulation upon application of external force on said formulation in said package.

Numerous other aspects are provided in accordance with these and other aspects of the invention. Other features and aspects of the present invention will become more fully apparent from the following detailed description and the appended claims.

DETAILED DESCRIPTION

As used herein, the word "a" or "plurality" before a noun represents one or more of the particular noun. For the terms "for example" and "such as," and grammatical equivalences thereof, the phrase "and without limitation" is understood to follow unless explicitly stated otherwise. As used herein, the term "about" is meant to account for variations due to experimental error. All measurements reported herein are understood to be modified by the term "about," whether or not the term is explicitly used, unless explicitly stated otherwise. As used herein, the singular forms "a," "an," and "the" include plural referents unless the context clearly dictates otherwise.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

This disclosure provides a formulation, which formulation may be filled in a package (a containment/dispensing system), which package may be pressurized. The formulation is cryogenic and kinetically active upon dispensing (i.e., being expelled) from the package. The package may not require vigorous shaking (or any shaking) before dispensing the formulation from the package. The formulation comprises one or more active agents that is co-mingled (co-processed) with one or more non-flammable liquid refrigerants (and/or flammable liquid refrigerants) prior to being filled under pressure into the package. Co-mingling involves mixing at high speed under controlled pressure and temperature. In some embodiments, the one or more liquid refrigerants are added in sufficient amounts to be dispersed in the formulation. In certain embodiments, the package maintains at least a minimal amount of pressure until substantially all the formulation in the package is expelled as a cryogenic, kinetically active formulation. The formulation in the package is expelled as a cryogenic, kinetically active formulation because, at least in part, due to the formulation being produced by having one or more active agents co-mingled (co-processed) with one or more non-flammable liquid refrigerants (and/or flammable liquid refrigerants) prior to being filled under pressure into the package. In certain embodiments, the package maintains at least a minimal amount of pressure to maintain the one or more liquid refrigerants dispersed in the formulation, so as to maintain the propellants in liquid rather than gaseous phase. In certain embodiments, the one or more non-flammable liquid refrigerants comprise Honeywell Solstice propellant 1234ze and/or Honeywell Solstice performance fluid 1233zd and/or HFC-245FA. In certain embodiments, the propellants are saturated into the formulation. In some embodiments, at least some of the propellants are liquid and the liquid propellants are solubilized in the formulation.

In some embodiments, the disclosed formulation is a formulation that contains pockets of liquid refrigerants entrained in a continuous liquid phase and does not exhibit the expanding behavior of a system containing fine air bubbles in a continuous liquid phase.

In some embodiments, the disclosed formulation has a specific gravity greater than or equal to 0.6.

This disclosure provides a method of making a cryogenic, kinetically active formulation in a package. The method comprises: selecting an amount of one or more non-flammable and/or flammable liquid refrigerants co-mingled with one or more active agents. Co-mingling involves mixing at high speed under controlled pressure and temperature. The one or more liquid refrigerants are dispersed in the formulation, and the formulation is filled under pressure into a package, which may be pressurized. The package may have a selected amount of pressure. In certain embodiments, the package maintains at least a minimal amount of pressure until substantially all the formulation in the package is expelled as a cryogenic, kinetically active formulation. In certain embodiments, the formulation is expelled (i.e., dispensed) from the package as a cryogenic, kinetically active formulation. In certain embodiments, the package maintains at least a minimal amount of pressure to maintain the one or more liquid refrigerants dispersed in the formulation, so as to maintain the propellants in liquid rather than gaseous phase. In certain embodiments, the one or more non-flammable liquid refrigerants comprise Honeywell Solstice propellant 1234ze and/or Honeywell Solstice performance fluid 1233zd and/or HFC-245FA. In certain embodiments, the propellants are saturated into the formulation. In some embodiments, at least some of the propellants are liquid and the liquid propellants are solubilized in the formulation. In certain embodiments, the pressurized package is under sufficient pressure such that the formulation, which may contain one or more non-flammable liquid refrigerants, may be expelled as a cryogenic, kinetically active formulation upon application of external force on the, for example, actuator or two-way controlled releasing valve containing the formulation, in the package.

This disclosure also provides a package (a containment/dispensing system), which may be pressurized. The package comprises a formulation, which is cryogenic, kinetically active upon dispensing from the package. The package may not require vigorous shaking before dispensing the formulation from the package. The formulation comprises one or more active agents that is co-mingled (co-processed) with one or more non-flammable and/or flammable liquid refrigerants prior to being filled under pressure into the package. Co-mingling involves mixing at high speed under controlled pressure and temperature. In some embodiments, the one or more liquid refrigerants are added in sufficient amounts to be dispersed in the formulation. In certain embodiments, the package maintains at least a minimal amount of pressure until substantially all the formulation in the package is expelled as a cryogenic, kinetically active formulation. In certain embodiments, the package maintains at least a minimal amount of pressure to maintain the one or more liquid refrigerants dispersed in the formulation.

In certain embodiments, the one or more non-flammable liquid refrigerants comprise Honeywell Solstice propellant 1234ze and Honeywell Solstice performance fluid 1233zd. In certain embodiments, the package maintains at least a minimal amount of pressure until substantially all the formulation in the package is expelled as a cryogenic, kinetically active formulation. In certain embodiments, the package maintains at least a minimal amount of pressure to maintain the one or more liquid refrigerants dispersed in the formulation, so as to maintain the propellants in liquid rather than gaseous phase. In certain embodiments, the one or more non-flammable liquid refrigerants comprise Honeywell Solstice propellant 1234ze and/or Honeywell Solstice performance fluid 1233zd and/or HFC-245FA.

The disclosed formulation exists in at least 3 states: prior to being filled into the package; inside the package; and after being dispensed (i.e., expelled) from the package.

The term "can" may be used to also mean "package," which is a containment/dispensing system.

The term "cryogenic" as used herein refers to intensely cool temperature, including close to freezing, freezing or subfreezing temperatures.

"Kinetically active" as used herein refers to bubbling/crackling/popping activity of the formulation that occurs after the formulation is dispensed from a containment/dispensing system, and may also include the associated sensory feel that can be experienced when mechanically agitating the dispensed product against the skin.

This disclosure also provides a disclosed cryogenic, kinetically active formulation that is expelled from a disclosed package.

The disclosed cryogenic, kinetically active formulation may be referred to herein as cryogenic formulation and/or product, cryogenic formulation and/or product, cryogenic formulation and/or product, cryofused formulation and/or product, cryo-infused formulation and/or product, and the like.

In other aspects, this disclosure provides a cryogenic, kinetically active formulation or a cryogenic, kinetically active formulation made by a disclosed method.

In other aspects, this disclosure provides a method of using a disclosed formulation, comprising administering the formulation to a subject, who may be in need thereof. A subject may be an animal or a human subject.

In certain embodiments, the package requires no shaking, or little shaking (substantially no shaking), to dispense a cryogenic and kinetically active formulation. The "no shake" aspect may be due to the ability to more uniformly distribute the micro pockets of liquid refrigerant through the formulation and keeping the formulation stable and "uniform".

This disclosure provides, in some aspects, formulations that incorporate liquefied refrigerants mixed at high speed into various base formulations, then filled into a bag-on-valve aerosol delivery system. The technology involves the controlled mixing of a non-flammable refrigerant with a base product formulation while under pressure, which can then be filled into a bag-on-valve aerosol delivery system. The mixing process is carefully controlled allowing the pre-determined amount of refrigerant to be accurately mixed with the product. Pressure and temperature are carefully controlled during the mixing process. In certain embodiments, the mixing is at high speed. The BOV and actuator are selected based on the desired delivery characteristics.

Aerosol products have been available for many years and were typically prepared using a flammable hydrocarbon type liquefied propellant or a non-liquid gas which required intense shaking prior to dispensing to yield a consistent foam. The disclosed package dispenses a uniform product without requiring shaking the package, which can be highly variable in aggressiveness and duration from customer to customer. Thus, the consumer may enjoy a consistent product throughout the entire life of the package. The incorporation of a non-flammable refrigerant blend to a non-flammable product base insures that the resulting product is not able to be ignited if the user is smoking or uses the product in an area where sources of ignition are present. In other embodiments, a more flammable formulation system may be permissible or desirable.

This disclosure also provides a method of preparing a disclosed cryogenic, kinetically active formulation, comprising:

controlled mixing at high speed of sufficient amounts of one or more non-flammable refrigerants with a composition comprising one or more active agents under pressure, wherein pressure and temperature are carefully controlled during mixing, resulting in a formulation;

Filling said formulation under pressure into a package;

wherein said one or more liquid refrigerants are added in sufficient amounts to be dispersed in the formulation and expelling the formulation from the package as a cryogenic, kinetically active formulation;

wherein said pressurized package is under sufficient pressure suitable to maintain the one or more liquid refrigerants dispersed in the formulation; and wherein said pressurized package is under sufficient pressure to expel said formulation as a cryogenic, kinetically active formulation upon application of external force on said formulation in said package.

In certain embodiments, one or more non-flammable liquid refrigerants comprise Honeywell Solstice propellant 1234ze and/or Honeywell Solstice performance fluid 1233zd and/or HFC-245FA.

By selecting a combination of Honeywell Solstice propellant 1234ze with Solstice Performance fluid 1233zd, a final non-flammable product can be prepared, which dispenses as a refrigerant rich formulation and possesses intense cooling properties when dispensed onto the skin. In some embodiments, the percentage of the Performance fluid 1233zd can be increased (more added) or decreased (less added). By varying the level of Solstice propellant 1234ze the quality of the rapid mixing can be modified to yield a stable formulation or a quick breaking formulation.

In certain embodiments, the liquid refrigerants are saturated into the formulation. In some embodiments, the liquid refrigerants are solubilized in the formulation.

By selecting an appropriate thickener for the base formulation, a dispensed product can be achieved which also can yield a crackling or popping effect when dispensed onto the skin. This crackling or popping effect enhances the cooling effect and creates a unique sensorial effect.

One application is cryogenic skin tighteners that cause the muscles under the skin to contract on application.

This technology may increase in scope of application when combined with a metering device which can control dispensed volume and/or weights. Such a system would enable application in the space of regulated products, including FDA drugs, that require a dosing mechanism to aid compliance of intended use, as might be the case in gas-infused topical analgesics.

Accordingly, by carefully selecting the desired combination of liquid refrigerants blends and product bases, mixing under tightly controlled conditions, and filling into a BOV while under pressure, this disclosure provides a product with beneficial results that can be used to relieve pain, effect a cosmetic tightening of the skin (such as on the face and neck), and act as a puncture "sealant" in both statically pressurized rotational systems (such as tires) and in the treatment of puncture wounds without the need for externally powered agitation/mixing of the formulation.

The formulations of this disclosure include, for example and without limitation: pain reduction products, which may soothe aching muscles or nerves of a subject; cryogenic skin tighteners, which may cause the muscles under the skin of the subject to contract on application; topical skin care products, where cooling and/or kinetic activity may be desirable; consumer-friendly tire inflation/repair kits without requiring lengthy and aggressive shaking of the package. The kind of formulation depends on the active ingredient(s) in the formulation and what application is desired. Other exemplary formulations include tires (which is a package of this disclosure) that are pre-filled with gas-infused formulation, which remains light and uniformly distributed until such time that a puncture occurs. Once the puncture occurs, the formulation could effectively escape through the puncture, expand, and cure, thus essentially creating a self-sealing tire that prevents "settling" of product within the tire, which can lead to an imbalance and poor driving performance at high rotational speeds. In other embodiments, additional applications may include in the industries where shaking of a static formulation prior to use may normally require agitation equipment or in-line mixing. The package of this disclosure does not require vigorous shaking. In other embodiments, the formulation includes deep wound closure and clotting products. These formulations could expand and be used in cases such as bullet wounds or puncture wounds. The formulation may allow physical blockage of the puncture, which, combined with clotting agents, may effectively minimize "bleed out" until proper medical attention could be secured. The package of this disclosure does not require vigorous shaking.

For each application, the disclosed formulation comprises the appropriate active ingredients and other ingredients.

The package of this disclosure may further comprise a metering device to control dispensed volume and/or weights. Such a system would enable application in the space of regulated products, including FDA drugs, that require a dosing mechanism to aid compliance of intended use, as might be the case in refrigerant infused topical analgesics.

This disclosure encompasses any formulation that may benefit from being a cryogenic formulation, especially if it is desirable for the formulation to be dispensed without having to shake the package vigorously (or hardly at all; or at all).

The formulations disclosed herein comprise one or more active agents for each of the above formulations.

In certain embodiments, the formulation is for topical application.

In certain embodiments, the cryogenic, kinetically active formulation product is a skincare product (such as a skin tightener), comprising one or more skincare active agents or skin tightening agents. An exemplary formulation for a skin tightening gel is shown in Example 1.

In certain embodiments, the pressurized package in which pressure may be generated and/or maintained sufficient for the disclosed formulations is a Bag-on-valve (BoV), Piston Can, or Bag-in-Can. In other embodiments, the pressurized package is a mechanical pressure system, including for example, bladder system (such as Exxal Atomos System), which is a PowerContainer system with a rubber bladder around the outside providing pressure to the internal volume. In certain embodiments, springs are used to exert pressure on a bag. In certain other embodiments, hydrostatic pressure is used to exert pressure on a bag.

The BoV helps to keep the micropockets of refrigerants evenly dispersed and stable. This helps both with the initial kinetic sensation the user feels when rubbing the formulation in, causing the micro-pockets to express when agitated.

In certain embodiments, the package is a bag on valve (BOV) pressurized assembly, comprising a two-way fill/dispensing valve, an attached internal high barrier bag affixed to the valve, and rigid container adapted to and capable of holding positive pressure, affixed to the valve. In certain further embodiments, the container is glass, barrier resin, metal/alloy, or another material capable of holding positive pressure. In certain other further embodiments, the container is pre-pressurized with one or more gas and/or liquid refrigerants prior to filling. In certain further embodiments, the BOV pressurized assembly dispenses the disclosed product in a metered dispensing system and not a continuously dosing system.

In certain embodiments, the containment/dispensing system is an aerosol system.

Formulation:

Non-shear thickening emulsion chemistries have been developed to allow for high levels of physical stability during temperature and pressure extremes, and post-dispensing stability. The chemistries have also been customized to allow for the inclusion of consumer-relevant ingredients that may include, for example and without limitation, moisturizers, emulsifying agents, film forming agents, thickening agents, antifungals, pH adjusters, pro vitamin additives, physical skin barriers, anti-bacterial agents, skin colorants, etc. Other ingredients are also contemplated, such as, without limitation, pain relief additives, UV blocking actives, skin healing actives, oil absorbing actives, redness reduction actives, skin penetrating actives, film forming actives, etc.

Processing:

In processing of certain embodiments, the blended formulation is transferred into a hopper, pressurized and under controlled temperature, rate of flow, and pressure, and is transferred into a high shear, continuous-flow, high-pressure "whipping" head, which rapidly mixes the base formulation with a series of infusion injector ports which controls the pressure and rates of flow with a selection of non-flammable liquid refrigerants to rapidly co-mingle the liquid refrigerants and formulation solution, effectively "saturating" the liquid refrigerants into the formulation prior to injection into the package, while concurrently emulsifying pockets of non-saturated liquid refrigerant evenly throughout the formula. The formulation is then tested for density inline and controlled under pressure and finally injected under pressure into the desired package.

In certain embodiments, the one or more non-flammable liquid refrigerants comprise one or more of Honeywell Solstice propellant 1234ze, Honeywell Solstice performance fluid 1233zd, and Honeywell HFC-245FA.

In certain embodiments, the one or more non-flammable liquid refrigerants comprise Honeywell Solstice propellant 1234ze and Honeywell Solstice performance fluid 1233zd. A combination of Honeywell Solstice propellant 1234ze and Honeywell Solstice performance fluid 1233zd results in a final non-flammable formulation, which possesses intense cooling properties (cryogenic). By varying the percentage of Honeywell Solstice propellant 1234ze, the cooling effect can be increased (more added) or decreased (less added).

In certain embodiments, Honeywell HFC-245FA is used as the one or more non-flammable liquid refrigerants.

Honeywell HFC-245FA is 1,1,1,3,3-Pentafluoropropane. Honeywell Solstice 1234ZE is trans-1,3,3,3-Tetrafluoroprop-1-ene. Honeywell Solstice 1233ZD is 1-Chloro-3,3,3-trifluoropropene.

In certain embodiments, Honeywell Solstice 1234ZE (may be referred to herein as 1234), Honeywell Solstice performance fluid 1233zd (may be referred to herein as 1233) and/or Honeywell HFC-245FA may be combined with standard "whipped" formulas previously developed. This would include first blending 1233, 1234, and/or HFC-245FA into the formulation and then infusing it with a pressurized gas, such as nitrous oxide.

In certain embodiments, the one or more non-flammable liquid refrigerants are 40% of the formulation.

In certain embodiments, the one or more non-flammable liquid refrigerants are 40% of the formulation and wherein the proportion of Honeywell Solstice propellant 1234ze and Honeywell Solstice performance fluid 1233zd is 3 to 1.

In certain embodiments, the percentage of Honeywell Solstice performance fluid 1233zd is 0.1% to 100% of the total amount of non-flammable liquid refrigerants in the formulation. In further embodiments, the percentage of Honeywell Solstice performance fluid 1233zd is 0.5% to 100% of the total amount of non-flammable liquid refrigerants in the formulation. In yet further embodiments, the percentage of Honeywell Solstice performance fluid 1233zd is 0.5% to 94% of the total amount of non-flammable liquid refrigerants in the formulation.

Unless otherwise noted or otherwise clear in context to a person of ordinary skill in the art, all % herein are weight to weight (w/w).

In certain embodiments, the package is a Bag on Valve (BOV) pressurized assembly, comprising a two-way fill/dispensing valve, an attached internal high barrier bag (affixed to valve), and rigid container capable of holding positive pressure (affixed to the valve). The container may be glass, barrier resin, metal/alloy, or another material capable of holding positive pressure. The container may be "pre-pressurized" with a combination of gaseous and/or liquid refrigerants prior to filling, with internal pressure expected to build as the internal volume is displaced during pressurized BOV filling.

Bag on Valve delivery systems differ from traditional aerosol delivery systems in at least the following distinct ways: Aerosols require propellant gases to be co-joined or co-mingled into the base formulation, as would be the case in single or multiphase system. These systems use the propellant gas to both expel the product and as a foaming and/or particle breakup agent. By contrast, a Bag on Valve system includes the use of a bag within a metal can. The bag is in direct contact with the single-phase formulation and is expelled by application of pressure to the outside of the bag. As such, the propellant gas inside the package never comes in contact with the product. Particle breakup or foaming can be accomplished through the dispensing actuator design and/or through the inclusion of a secondary gas within the formulation.

This BOV design has a several distinct benefits over traditional aerosol systems including without limitation:
  Very high levels of product evacuation (>99% or even greater than 99.5%)
  The ability to dispense formulas without the need to comingle with the liquid refrigerant ("pure" formula concentrate).

In some embodiments, the disclosed cryogenic, kinetically active product formulation dispenses in a continuous stream when an external pressure is applied to the device, such as by depressing the valve/actuator, thereby eliminating the need to squeeze and shake the formulation out of a bottle or tube.

In other embodiments, the disclosed cryogenic, kinetically active product in its device (package) operates as a "one-touch" delivery system. In such system, the user will hold down the actuator until the desired amount of formulation is dispensed.

The disclosed cryogenic, kinetically active formulation product can be used for any application that would benefit from such product, including, for example and without limitation, skincare, sunscreen, After Sun care, vitamins, wound care, etc. For each application, the formulation needs to comprise the corresponding active agent(s) and may further comprise other appropriate ingredients.

The term "emulsion" identifies oil-in-water (o/w) or water-in-oil (w/o) type dispersion formulations.

In certain embodiments, the cryogenic, kinetically active formulation product comprises one or more thickening agent and/or an emulsifying agent.

Suitable emulsifiers are those known in the art for producing oil-in-water type emulsions. An aqueous external phase is preferred by many people for skin contact, since it is not as likely to produce an oily or greasy sensation when it is being applied, as is an emulsion having an oil external phase. The typical oil-in-water emulsifier has a hydrophilic-lipophilic balance (frequently abbreviated as "HLB") value greater than about 9, as is well known in the art. However, this "rule" is known to have numerous exceptions. The chosen emulsifier, depending upon its chemical nature, will be a component of either the oil or aqueous phase or both, and assists with both the formation and the maintenance, or stability, of the emulsion.

Non-limiting examples of suitable emulsifiers or surfactants include pharmaceutically acceptable, non-toxic, non-ionic, anionic and/or cationic surfactants. Examples of suitable non-ionic surfactants include, for example and without limitation, glycerol fatty acid esters such as glycerol monostearate, glycol fatty acid esters such as propylene glycol monostearate, polyhydric alcohol fatty acid esters such as polyethylene glycol (400) monooleate, polyoxyethylene fatty acid esters such as polyoxyethylene (40) stearate, polyoxyethylene fatty alcohol ethers such as polyoxyethylene (20) stearyl ether, polyoxyethylene sorbitan fatty acid esters such as polyoxyethylene sorbitan monostearate, sorbitan esters such as sorbitan monostearate, alkyl glycosides such as cetearyl glucoside, fatty acid ethanolamides and their derivatives such as the diethanolamide of stearic acid, Prolipid and the like. An example of a suitable prolipid is Prolipid 141 which lists behenyl alcohol, glyceryl stearate, palmitic acid, stearic acid, myristyl alcohol, lauryl alcohol, cetyl alcohol and lecithin as its ingredients in its Formula Data Sheet. Examples of suitable anionic surfactants are soaps including, for example and without limitation, alkali soaps, such as sodium, potassium and ammonium salts of aliphatic carboxylic acids, usually fatty acids, such as sodium stearate. Organic amine soaps include, for example and without limitation, organic amine salts of aliphatic carboxylic acids, usually fatty acids, such as triethanolamine stearate. Metallic soaps include salts of polyvalent metals and aliphatic carboxylic acids, usually fatty acids, such as aluminum stearate. Other classes of suitable anionic surfactants include, for example and without limitation, sulfated fatty acid alcohols such as sodium lauryl sulfate, sulfated oils such as the sulfuric ester of ricinoleic acid disodium salt, and sulfonated compounds such as alkyl sultanates including sodium cetane sulfonate, amide sulfonates such as sodium N-methyl-N-oleyl laurate, sulfonated dibasic acid esters such as sodium dioctyl sulfosuccinate, alkyl aryl sulfonates such as sodium dodecylbenzene sulfonate, alkyl naphthalene sulfonates such a sodium isopropyl naphthalene sulfonate, petroleum sultanate such as aryl naphthalene with alkyl substitutes. Examples of suitable cationic surfactants include, for example and without limitation, amine salts such as octadecyl ammonium chloride, quaternary ammonium compounds such as benzalkonium chloride. Non-limiting examples of emulsifiers include a mixture of cetearyl glucoside and cetearyl alcohol, available under the trade name Emulgade PL68/50 from Henkel KGaA, and PEG 30 dipolyhydroxy stearate, available under the trade name Arlacel 135 from ICI. Also preferred are various $C_{12-15}$, $C_{12-16}$ and $C_{14-15}$ alcohols available from various manufacturers, and Ceteareth 2, 10, 18, 22, Ceteth-1 and 20, cetyl dimethicone copolyol, and cetyl phosphate, glyceryl stearate, Oleth 3 and 10, polyglyceryl 3 methylglucose dis-tearate sorbitan isostearate, steareth 2, 10, and/or 20.

Other suitable emulsifiers are those known in the art for producing water-in-oil type emulsions. Non-limiting examples of some suitable water-in-oil emulsions include, for example and without limitation, SIMALINE WO (PEG-30 Dipolyhydroxystearate; available from Seppic), FLU-IDANOV 20X (Octyldodecanol & Octyldodecyl Xyloside; available from Seppic), ES-5300 (Lauryl PEG-10 Tris(trimethylsiloxy)silylethyl Dimethicone; available from Dow Corning), Abil EM90 (Cetyl PEG/PPG-10/1 Dimethicone; available from Evonik) and Abil WE09 (Polyglyceryl-4 Isostearate and Cetyl PEG/PPG-10/1 Dimethicone and Hexyl Laurate; available from Evonik). The typical water-in-oil emulsifier has a HLB value of about 4 to about 6, however, this "rule" is also known to have numerous exceptions.

It may be advantageous to incorporate thickening agents (also referred to herein as thickener), such as, for instance, Avicel RC-591, Carbopol Ultrez, Carbopol ETD 2001, available from the B. F. Goodrich Co, Abil Wax 9801, a surfactant available from Evonik, Sodium Acrylates Copolymer Alginic Acid, available from Kelco, cellulose gum, available from TIC Gums, ammonium acrylates copolymer, ammonium polyacryloyl dimethyl taurate, bentonite available from Southern Clay, guar hydroxpropyltrimonium chloride available from Henkel, hydroxy propylprocellulose available from Aqualon, magnesium aluminum silicate, available from Salomon, potassium alginate available from Kelco, beeswax available from Strahl & Pitsch, and behenyl alcohol available from Nikko.

Insect repelling components may also a desirable ingredient in certain skincare and sunscreen formulations, if the formulations are to be used by persons engaged in outdoor activities. The most widely used insect repelling agent for personal care products is N,N-Diethyl-m-toluamide, frequently called "DEET" and available in the form of a concentrate containing at least about 95 percent DEET. Other synthetic chemical repellents include, for example and without limitation, dimethyl phthalate, ethyl hexanediol, indalone, di-n-propylisocinchoronate, bicycloheptene, dicarboximide, IR3535 (3-[N-Butyl-N-acetyl]-aminopropionic acid, ethyl ester; available from Merck KGaA)) and tetrahydrofuraldehyde. Certain plant-derived materials also have insect repellent activity, including citronella oil and other sources of citronella (including lemon grass oil), limonene, rosemary oil and eucalyptus oil. Choice of an insect repellent for incorporation into the skincare or sunscreen emulsion will frequently be influenced by the odor of the repellent. The amount of repellent agent used will depend upon the choice of agent; DEET is useful at high concentrations, such as up to about 15 percent or more, while some of the plant-derived substances are typically used in much lower amounts, such as 0.1 percent or less.

The disclosed formulation/formulations may contain a wide range of additional, optional components. The CTFA Cosmetic Ingredient Handbook, Seventh Edition, 1997, the Eighth Edition, 2000, and the Personal Care Council website (http://www.personalcarecouncil.org/), describe a wide variety of cosmetic and pharmaceutical ingredients commonly used in skin care formulations, which are suitable for use in the formulations of the present invention. Examples of these functional classes disclosed in these references include, for example and without limitation, absorbents, abrasives, anti-caking agents, anti-foaming agents, antioxidants, binders, biological additives, buffering agents, bulking agents, chelating agents, chemical additives, colorants, cosmetic astringents, cosmetic biocides, cryoprotectants, film stabilizers, denaturants, drug astringents, external analgesics, film formers, fragrance components, humectants, pacifying agents, pH adjusters, plasticizers, preservatives, propellants, reducing agents, skin bleaching agents, skin-conditioning agents (emollients, humectants, miscellaneous, and occlusive), skin protectants, solvents, SPF enhancers/boosters, foam boosters, hydrotropes, solubilizing agents, suspending agents (nonsurfactant), sunscreen agents, ultraviolet light absorbers, water-proofing agents, and viscosity increasing agents (aqueous and nonaqueous).

An emollient is a substance which helps to smooth and soften the skin, and may also reduce its roughness, cracking or irritation. Non-limiting examples of suitable emollients include, for example and without limitation, mineral oil having a viscosity in the range of 50 to 500 centipoise (cps), lanolin oil, coconut oil, cocoa butter, olive oil, almond oil, macadamia nut oil, aloe extracts such as aloe vera lipoquinone, synthetic jojoba oils, natural Sonora jojoba oils, safflower oil, corn oil, liquid lanolin, cottonseed oil and peanut oil. Preferably, the emollient is a cocoglyceride, which is a mixture of mono, di and triglycerides of cocoa oil, sold under the trade name of Myritol 331 from Henkel KGaA, or Dicaprylyl Ether available under the trade name Cetiol OE from Henkel KGaA or a Cu-Cis Alkyl Benzoate sold under the trade name Finsolv TN from Finetex. Another suitable emollient is DC 200 Fluid 350, a silicone fluid, available from Dow Corning Corp. One or more emollients may be present ranging in amounts from about 1 percent to about 10 percent by weight, preferably about 5 percent by weight.

Other suitable emollients include, for example and without limitation, squalane, castor oil, polybutene, sweet almond oil, avocado oil, calophyllum oil, ricin oil, vitamin E acetate, olive oil, silicone oils such as dimethylopolysiloxane and cyclomethicone, linolenic alcohol, oleyl alcohol, the oil of cereal germs such as the oil of wheat germ, isopropyl palmitate, octyl palmitate, isopropyl myristate, hexadecyl stearate, butyl stearate, decyl oleate, acetyl glycerides, the octanoates and benzoates of ($C_{12}$-$C_{15}$) alcohols, the octanoates and decanoates of alcohols and poly-alcohols such as those of glycol and glyceryl, ricinoleates esters such as isopropyl adipate, hexyl laurate and octyl dodecanoate, dicaprylyl maleate, hydrogenated vegetable oil, phenyltrimethicone, jojoba oil and aloe vera extract.

Other suitable emollients which are solids or semi-solids at ambient temperatures may be used. Such solid or semi-solid cosmetic emollients include, for example and without limitation, glyceryl dilaurate, hydrogenated lanolin, hydroxylated lanolin, acetylated lanolin, petrolatum, isopropyl lanolate, butyl myristate, cetyl myristate, myristyl myristate, myristyl lactate, cetyl alcohol, isostearyl alcohol and isocetyl lanolate. One or more of these emollients can be optionally included in the formulation.

The disclosed cryogenic, kinetically active formulations can further comprise skin protectant active agents. Suitable examples include, for example and without limitation, (with preferred weight percent ranges), Allantoin (0.5 to 2 percent); Aluminum hydroxide gel (0.15 to 5 percent), Calamine (1 to 25 percent); Cocoa butter (greater than 50 percent); Cod liver oil (5 to 14 percent); Dimethicone (1 to 30 percent); Glycerin (20 to 45 percent); Hard fat (greater than 50 percent); Kaolin (4 to 20 percent); Lanolin (12.5 to 50 percent); Mineral oil (greater than 50 percent); Petrolatum (greater than 30 percent); Topical starch (10 to 98 percent); White petrolatum (greater than 30 percent); Zinc acetate (0.1 to 2 percent); Zinc carbonate (0.2 to 2 percent); and Zinc oxide (1 to 25 percent). Additional skin protectant active agents may include Colloidal oatmeal or Sodium bicarbonate.

Water is employed in amounts effective to form the emulsion. It is generally preferred to use water which has been purified by processes such as deionization or reverse osmosis, to improve the batch-to-batch formulation inconsistencies which can be caused by dissolved solids in the water supply. The amount of water in the emulsion or formulation can range from about 15 percent to 95 weight percent.

A humectant is a moistening agent that promotes retention of water due to its hygroscopic properties. Suitable humectants include, for example and without limitation, glycerin, polymeric glycols such as polyethylene glycol and polypropylene glycol, mannitol and sorbitol. Preferably, the humectant is glycerin, Sorbitol 70% USP or polyethylene glycol 400, NF. More preferably, the humectant is glycerin. One or more humectants can optionally be included in the formulation in amounts from about 1 percent to about 10 percent by weight, preferably about 5 percent by weight. Other suitable humectants include, inter alia, fructose, glucose, lactic acid, PCA, potassium lactate and PCA, propylene glycol, sodium lactate, PCA, and etc.

A dry-feel modifier is an agent which when added to an emulsion, imparts a "dry feel" to the skin when the emulsion dries. Dry feel modifiers can include, for example and without limitation, talc, kaolin, chalk, starches, zinc oxide, silicone fluids, inorganic salts such as barium sulfate, surface treated silica, precipitated silica, fumed silica such as an Aerosil (silica) available from Evonik Industries, DryFlo starch (aluminum starch octenylsucinate available from Akzo Nobel), and/or an epichlorohydrin cross-linked glyceryl starch, available from Ingredion, Inc. Bridgewater, N.J., under the current tradename of Vulca 90 starch.

The disclosed formulation may additionally contain waterproofing agents. A waterproofing or water resistance agent is a hydrophobic material that imparts film forming and waterproofing characteristics to an emulsion. A waterproofing agent that can be used, for example and without limitation, is a copolymer of vinyl pyrollidone and eicosene and dodecane monomers such as the Ganex V 220, Ganex P-904 LC, and Ganex V 216 Polymers, respectively, available from Ashland Inc. Still other suitable waterproofing agents include poly alfa olefin polymers, such as Performa V 825 available from New Phase Technologies and polyanhydride resin No. 18 available under the trade name PA-18 from Chevron. Additional examples of waterproofing agents are polyurethane polymers. Some such polymers are described, for example, in U.S. Pat. No. 7,097,828.

An antimicrobial preservative may be part of the disclosed formulation. An antimicrobial preservative is a substance or preparation which destroys, prevents or inhibits the proliferation of, microorganisms in the skincare formulation, and which may also offer protection from oxidation. Preservatives are frequently used to make self-sterilizing, aqueous based products such as emulsions. This is done to prevent the development of microorganisms that may grow in the product during the manufacture and distribution of the product and/or during use by consumers, who may further inadvertently contaminate the products during normal use. Typical preservatives include, for example and without limitation, the lower alkyl esters of para-hydroxyben-zoates (parabens), especially methylparaben, propylparaben, isobutylparaben and mixtures thereof, benzyl alcohol, phenyl ethyl alcohol and benzoic acid. The preferred preservative is available under the trade name of Germaben II from Sutton or a combination of chlorophenesin and benzyl alcohol. One or more antimicrobial preservatives can optionally be included in an amount ranging from about 0.001 to about 10 weight percent, preferably about 0.05 to about 1 percent.

An antioxidant may be part of the disclosed formulation. An antioxidant is a natural or synthetic substance added to the sunscreen to protect from or delay its deterioration due to the action of oxygen in the air (oxidation) and to protect the skin from sun damage. Antioxidants prevent oxidative deterioration which may lead to the generation of rancidity and nonenzymatic browning reaction products. Typical suitable antioxidants include, for example and without limitation, propyl, octyl and dodecyl esters of gallic acid, butylated hydroxyanisole (BHA, usually purchased as a mixture of ortho and meta isomers), butylated hydroxytoluene (BHT), nordihydroguaiaretic acid, Oxynex (Oxynex ST liquid is a mixture of diethylhexyl syringyliden-emalonate and caprylic/capric triglyceride), Vitamin A, Vitamin E and Vitamin C. One or more antioxidants can optionally be included in the formulation in an amount ranging from about 0.001 to about 5 weight percent, preferably about 0.01 to about 0.5 percent.

Chelating agents may be part of the disclosed formulation. Chelating agents are substances used to chelate or bind metallic ions, such as with a heterocyclic ring structure so that the ion is held by chemical bonds from each of the participating rings. Suitable chelating agents include, for example and without limitation, ethylene diaminetetraacetic acid (EDTA), EDTA disodium, calcium disodium edetate, EDTA trisodium, citric acid, EDTA tetrasodium and EDTA dipotassium. One or more chelating agents can optionally be included in the formulation in amounts ranging from about 0.001 to about 0.2 weight, percent preferably about 0.01% weight percent.

The disclosed formulation may include stabilizers or stabilizing agents. Non-limiting examples of suitable stabilizers include, for example and without limitation, the Avicels, Capmul S12L, Capmul S18L, Amilite GCK-12, Amadol CMA-2, Ampholak 7 CX-C, Ampholak X CO-30, Polyox WSR N-10, Amaranth S, Foam-Coll 5, Blanose 12M31XP, Genu carrageenan, Avanel S150CG and others. Avicel is an example that can be used in the formulation. For example, Avicel RC-591 is a mixture of cellulose gum and microcrystalline cellulose. Some stabilizers also help improve long term high temperature stability.

Fragrances are aromatic substances which can impart an aesthetically pleasing aroma to the skincare or sunscreen formulation and may be part of the disclosed formulation. Typical fragrances include, for example and without limitation, aromatic materials extracted from botanical sources (i.e., rose petals, *gardenia* blossoms, jasmine flowers, etc.) which can be used alone or in any combination to create essential oils. Alternatively, alcoholic extracts may be prepared for compounding fragrances. However, due to the relatively high costs of obtaining fragrances from natural substances, the modern trend is to use synthetically prepared fragrances, particularly in high-volume products.

A pH modifier may be part of the disclosed formulation. A pH modifier is a compound that will adjust the pH of a formulation to a lower, e.g., more acidic pH value, or to a higher, e.g., more basic pH value. The disclosed formulations may contain such pH modifiers as is necessary.

In some embodiments, an SPF enhancer or booster, including styrene/acrylates copolymer (such as Sunspheres PGL, commercially available from Dow Chemical), and/or skin active agents, and/or anti-oxidants, may be optionally added to the formulation.

The disclosed formulation has been developed, in part, to offer consumers a unique and better way to apply topical products such as cryogenic skin tighteners to themselves and others.

In certain embodiments, the disclosed formulation product allows for high levels of product evacuation, particularly for viscous products as compared to traditional non-pressurized emulsion packaging. In certain embodiments, the disclosed formulation product with its pressured system allows for elevated levels of gas to be saturated into formulation, beyond what ambient would normally allow, which can lower resulting dispensed densities and reduce sputtering that can be caused by saturating high levels of gas into formulation but failing to provide adequate pressure to contain the saturated gas. In certain embodiments, the disclosed formulation product results in reduced corrosion potential by separating the formulation from the rigid, pressurized container (if metal) by containing the formulation in the internal bag.

In certain embodiments, the disclosed formulation product can have its whipping agent, pressure, and gas dispersion customized for each formulation. Whereas oil and water emulsions are particularly well suited for specific gases, liquid refrigerants can provide much larger bubble structures. BOV dispensing mechanism allows for co-blending of the various types of liquid and gas-phase propellant allowing to dispense products without substantially altering temperature or potentially induce a cooling effect due to phase change energy absorption.

In some embodiments, the disclosed package is designed to dispense, for example and without limitation, lotion/cream/ointment/oral dosage form in a controlled manner by delivering a pressurized formulation via a dispensing orifice at the touch of a button. The disclosed formulation is dispensed via an actuator that depresses a valve stem into a male or female aerosol valve. Upon activation, the gas-saturated formulation experiences a drop in pressure as it moves from a pressurized containment system to ambient conditions. This change in pressure allows the saturated/Incorporated gas to rapidly expand, creating bubbles within the formulation, leading to a formulation of reduced density. Formulation customizations allow these bubbles to remain stable for 10 seconds or longer, permitting the user to spread the resulting product onto a surface with enhanced coverage benefits.

Although specific suppliers of commercially available ingredients may be listed herein, it is understood that these products may be available from additional suppliers and that the instant invention is not limited to only that ingredient from the specifically cited supplier. Rather the supplier is being provided as an example of what is commercially available.

EXAMPLES

For this invention to be better understood, the following examples are set forth. These examples are for purposes of illustration only and are not be construed as limiting the scope of the invention in any manner.

Example 1. Cryogenic, Kinetically Active Skin Tightening Gel

This cryogenic kinetically active skin tightening gel comprises the following ingredients: Tetrafluoropropene, Water/Aqua/Eau, Alcohol Denat, Isododecane, Menthyl Ethylamido Oxalate, PPG-8-Ceteth-20, Propanediol, Ammonium Acryloyldimethyltaurate/VP Copolymer, Dimethicone, *Pseudoalteromonas* Ferment Extract, Pullulan, Betaine, Inositol, Glycerin, Poly silicone-11, Panthenol, Coco-Caprylate/Caprate, Hydroxyethylcellulose/Phosphorylcholine Glycol Acrylate Copolymer, *Nannochloropsis OCULATA* Extract, Butylene Glycol, Hydrolyzed Hyaluronic Acid, *Paeonia albiflora* Root Extract, Disodium Acetyl Glucosamine Phosphate, Sodium Glucuronate, Phenoxyethanol, Adenosine, *Lavandula angustifolia* (Lavender) Oil, Salicylic Acid, Sodium Benzoate, Linalool, Potassium Sorbate, Decyl Glucoside, Magnesium Sulfate, Sodium Hydroxide, Citric Acid, Ethylhexylglycerin, Caprylyl Glycol, Hexylene Glycol. This is the Product Concentrate.

This gel also comprises a 60/40 combination of Product Concentrate (above) to refrigerant Blend. Of that, a 75/25 combination of Honeywell Solstice 1234 to Honeywell Solstice 1233 is used.

A formulation is made incorporating liquefied refrigerants whipped (mixed) at high speed into various base formulations, then filled into a bag-on-valve aerosol delivery system. The technology involves the controlled mixing of a non-flammable refrigerant with a base product formulation while under pressure, which can then be filled into a bag-on-valve aerosol delivery system. The whipping/mixing process is carefully controlled allowing the pre-determined amount of refrigerant to be accurately mixed with the base formulation. Pressure and temperature are carefully controlled during the mixing process. The BOV and actuator are selected based on the desired delivery characteristics.

The resulting package dispenses, without shaking, a uniformly cryogenic, and kinetically active product.

Example 2 Testing of Cryogenic, Kinetically Active Products

In a traditional aerosol package, the dispersion of two propellants in an intermediate bulk product requires shaking the finished filled package to disperse the two propellants uniformly. However, aerosols are often under mixed, resulting in uneven blends of the propellants and intermediate bulk, often producing irregular dispensing and incomplete dispensing if the propellants are depleted prior to the can contents being evacuated.

For this study, to obtain Cryo-infused (or cryo-fused) sample, the product was infused with two non-flammable refrigerants (Honeywell Solstice 1234 and Honeywell Solstice 1233). The refrigerants were dispersed uniformly, and then the refrigerant/bulk mixture was injected into a Bag-on-Valve System (BOV). With this process, the two refrigerants are dispersed uniformly throughout the product and thus allowing for a uniform and consistent delivery.

As a comparison, three (3) traditional aerosol cans were produced with the same ratios of intermediate bulk and the two propellants.

In the traditional aerosol packaging, the delivery is dependent on the user shaking the can very well to distribute the two refrigerants through the product. As "shaking very well" is a subjective measurement, three (3) samples were prepared. The first was shaken vigorously for five (5) minutes, the second sample was given three (3) shakes with moderate force after the refrigerant was added, and three (3) shakes prior to dispersing for each test. The final sample was turned gently upside down three (3) times immediately after the refrigerant was added, to simulate possible agitation after filling, and this sample was not shaken again during the study.

These samples were subjected to the following tests:

35° C. "Foam" Collapse:

Can was shaken or not shaken as per the unit being tested. Approximately 1 g product was dispensed into 1.5" diameter foil weigh boat and placed into a warming oven maintaining 35° C.±2° C. The product was observed until bubbles stopped forming or a maximum of 10 minutes. At the end of the test, the remaining product was depressed with the index finger. If the remaining product still "crackled" against the fingertip, refrigerant remained in the product.

45° C. "Foam" Collapse:

Repeat the procedure for 35° C. "Foam" Collapse but the oven is set to 45° C.±2° C.

Temperature (Temp) Change:

A length of aluminum foil is folded into a vee and set onto a holder that allows the thermometer to lay flat. The initial temperature is recorded, then the product is dispensed along the shaft of the thermometer, the timer is started, and the first reading is taken at five (5) second intervals for the first minute; ten (10) second intervals for the next three (3) minutes; fifteen (15) second intervals for the next two minutes; and at thirty (30) second intervals for the last two minutes. The time to return to 16° C. is noted for each sample.

Dispensing Observations:

The samples are observed over 5 uses with or without shaking the can as noted above.

Results are Shown in Tables 1-5.

TABLE 1

| | | "Foam" Collapse | | | |
|---|---|---|---|---|---|
| | | BOV: Cryofused Not Shaken (60%/30%/10%) (Concentrate/1234/1233) | Traditional Aerosol Well Shaken (60%/30%/10%) (Concentrate/1234/1233) | Traditional Aerosol Slightly Shaken (60%/30%/10%) (Concentrate/1234/1233) | Traditional Aerosol Not Shaken (60%/30%/10%) (Concentrate/1234/1233) |
| 35° C. "Foam" Collapse | Start Weight (g): 1.05 End Weight (g): | Start Weight (g): 1.00 End Weight (g): | Start Weight (g): 1.11 End Weight (g): | Pure refrigerant expelled from can as gas and liquid. No | |

TABLE 1-continued

"Foam" Collapse

| | BOV: Cryofused Not Shaken (60%/30%/10%) (Concentrate/1234/1233) | Traditional Aerosol Well Shaken (60%/30%/10%) (Concentrate/1234/1233) | Traditional Aerosol Slightly Shaken (60%/30%/10%) (Concentrate/1234/1233) | Traditional Aerosol Not Shaken (60%/30%/10%) (Concentrate/1234/1233) |
|---|---|---|---|---|
| (Maximum 10 min) | 0.63<br>ΔWeight (g): −0.42<br>Time (min:sec): 10:01<br>Still Crackles: YES<br>Refrigerant still dispersed | 0.69<br>ΔWeight (g): −0.31<br>Time (min:sec): 9:01<br>Still Crackles. NO<br>No refrigerant remains | 1.00<br>ΔWeight (g): −0.11<br>Time (min:sec): 8:50<br>Still Crackles: NO<br>No refrigerant remains | foam was produced. Did NOT put the gas into the warming oven. |
| 45° C. "Foam" Collapse (Maximum 10 | Start Weight (g): 1.10<br>End Weight (g): 0.54<br>ΔWeight (g): −0.56 | Start Weight (g): 1.03<br>End Weight (g): 0.64<br>ΔWeight (g): −0.39 | Start Weight (g): 1.32<br>End Weight (g): 0.94<br>ΔWeight (g): −0.38 | Start Weight (g): 1.18<br>End Weight (g): 0.89<br>ΔWeight (g): −0.29 |

TABLE 2

Temperature Change

| BOV: Cryofused Not Shaken (60%/30%/10%) (Concentrate/1234/1233) | Traditional Aerosol Well Shaken (60%/30%/10%) (Concentrate/1234/1233) | Traditional Aerosol Slightly Shaken (60%/30%/10%) (Concentrate/1234/1233) | Traditional Aerosol Not Shaken (60%/30%/10%) (Concentrate/1234/1233) |
|---|---|---|---|
| Start Temp (° C.): 20.0° C.<br>Low Temp (° C.): −3.1° C.<br>Time to 16° C.: >10 min<br>Comments: Prolonged Cooling | Start Temp (° C.): 20.2° C.<br>Low Temp (° C.): 10.3° C.<br>Time to 16° C.: 6:56 min/see<br>Comments: Never goes sub-zero. Quick return to temp. | Start Temp (° C.): 20.9° C.<br>Low Temp (° C.): 7.5° C.<br>Time to 16° C.: 7:11 min/sec<br>Comments: Never goes sub-zero. Quick return to temp. | Start Temp (° C.): 21.4° C.<br>Low Temp (° C.): −33.5° C.<br>Time to 16° C.: 7:30 min/sec<br>Comments: Only able to run test once. Stopped dispense |
| Uniform | Uniform foamlike | Foamlike | Liquid and gas, some foamlike product |
| Uniform | Uniform foamlike | Foamlike with some spurts of gas | Foamlike with gas bursts |
| Uniform | Uniform foamlike | Foamlike with some gas expelled | Foamlike with gas bursts |
| Uniform | Uniform foamlike | Foamlike with some gas and some liquid expelled | Doesn't dispense |
| Uniform | Uniform foamlike | Gel-like foamlike with some gas | Doesn't dispense |
| BOV: Cryofused Not Shaken (60%/30%/10%) (Concentrate/1234/1233) | Traditional Aerosol Well Shaken (60%/30%/10%) (Concentrate/1234/1233) | Traditional Aerosol Slightly Shaken (60%/30%/10%) (Concentrate/1234/1233) | Traditional Aerosol Not Shaken (60%/30%/10%) (Concentrate/1234/1233) |

TABLE 3

Multiple Use

| | | BOV: Cryofused Not Shaken (60%/30%/10% (Concentrate/1234/1233) | Traditional Aerosol Well Shaken (60%/30%/10%) (Concentrate/1234/1233) | Traditional Aerosol Slightly Shaken 60%/30%/10%) (Concentrate/1234/1233) | Traditional Aerosol Not Shaken (60%/30%/10%) (Concentrate/1234/1233) |
|---|---|---|---|---|---|
| Multiple Use Test | U1 | Uniform | Uniform foamlike | Foamlike | Liquid and gas, some foamlike |

TABLE 3-continued

Multiple Use

|  |  | BOV: Cryofused Not Shaken (60%/30%/10% (Concentrate/1234/1233) | Traditional Aerosol Well Shaken (60%/30%/10%) (Concentrate/1234/1233) | Traditional Aerosol Slightly Shaken 60%/30%/10%) (Concentrate/1234/1233) | Traditional Aerosol Not Shaken (60%/30%/ 10%) (Concentrate/1234/ 1233) |
|---|---|---|---|---|---|
| Sample must rest between uses, and will be shaiken as described above. | U2 | Uniform | Uniform foamlike | Foamlike with some spurts of gas | Foamlike with gas bursts |
| | U3 | Uniform | Uniform foamlike | Foamlike with some gas expelled | Foamlike with gas bursts |
| | U4 | Uniform | Uniform foamlike | Foamlike with some gas and some liquid expelled | Doesn't dispense |
| | U5 | Uniform | Uniform foamlike | Gel-like foamlike with some gas | Doesn't dispense |

Summary of Results

35° C. "Foam" Break:

The Cryofused BOV sample demonstrated the longest retention of the propellant(s), which indicates prolonged cooling and aesthetics.

45° C. "Foam" Break:

Again, the Cryofused BOV demonstrated the longest retention, and even at the elevated temperature maintained the propellant in the matrix until physical manipulation.

Temperature Change:

Though the unshaken sample technically reached colder temperatures, the irregularity of the spray and the bursts of pure gas propellant(s) and/or liquid refrigerant(s) is undesirable. Again, the Cryofused BOV demonstrated the lowest controlled and repeatable cooling to below zero Celsius temperatures, and it maintained the cool temperature for a longer amount of time.

Multiple Use Test

Both the Cryofused BOV and the vigorously shaken traditional aerosol repeatedly produced uniform composition. However, if the sample receives moderate shaking or none at all, the formulation dispersed with bursts of gas and/or liquid refrigerant. After three uses, the unshaken sample no longer dispensed product despite being full.

Overall, the Cryofused BOV produced the most uniform cooling, crackling, and sustained temperature depression of all the samples, and it performs superiorly to the traditional aerosol.

TABLE 4

Temperature Change

| BOV Cryogenic Infused | | | Traditional Aerosol: Shaken Vigorously | | | Traditional Aerosol Shaken Slightly | | | Traditional Aerosol: Not Shaken | | |
|---|---|---|---|---|---|---|---|---|---|---|---|
| Time | Temp (° C.) | | Time | Temp (° C.) | | Time | Temp (° C.) | | Time | Temp (° C.) | |
| (min:sec) | Try 1 | Try 2 | (min:sec) | Try 1 | Try 2 | (min:sec) | Try 1 | Try2 | (min:sec) | *Try 1* | *Try 2* |
| 0:00 | 20.0 | 20.5 | 0:00 | 20.2 | 20.8 | 0:00 | 20.9 | 20.3 | 0:00 | 21.0 | N/A |
| 0:05 | −1.0 | 0.7 | 0:05 | 16.0 | 14.1 | 0:05 | 16.0 | 15.3 | 0:05 | −31.0 | N/A |
| 0:10 | −2.0 | −0.1 | 0:10 | 13.4 | 9.1 | 0:10 | 11.9 | 10.8 | 0:10 | −33.5 | N/A |
| 0:15 | −2.6 | −0.9 | 0:15 | 11.4 | 5.2 | 0:15 | 10.2 | 9.5 | 0:15 | −31.3 | N/A |
| 0:20 | −3.0 | −1.6 | 0:20 | 11.4 | 3.7 | 0:20 | 9.5 | 9.5 | 0:20 | −29.0 | N/A |
| 0:25 | −3.1 | −1.7 | 0:25 | 10.8 | 3.1 | 0:25 | 8.9 | 9.7 | 0:25 | −27.3 | N/A |
| 0:30 | −3.1 | −2.0 | 0:30 | 10.4 | 3.1 | 0:30 | 8.1 | 9.7 | 0:30 | −24.8 | N/A |
| 0:35 | −2.9 | −2.2 | 0:35 | 10.3 | 3.3 | 0:35 | 7.7 | 8.8 | 0:35 | −22.3 | N/A |
| 0:40 | −2.7 | −2.4 | 0:40 | 10.3 | 3.5 | 0:40 | 7.5 | 8.0 | 0:40 | −21.1 | N/A |
| 0:45 | −2.4 | −2.6 | 0:45 | 10.3 | 3.6 | 0:45 | 7.5 | 8.0 | 0:45 | −19.8 | N/A |
| 0:50 | −2.0 | −2.6 | 0:50 | 10.3 | 3.7 | 0:50 | 7.5 | 8.6 | 0:50 | −18.7 | N/A |
| 0:55 | −1.6 | −2.4 | 0:55 | 10.3 | 3.9 | 0:55 | 7.5 | 9.0 | 0:55 | −17.8 | N/A |
| 1:00 | −1.2 | −2.2 | 1:00 | 10.3 | 4.4 | 1:00 | 7.6 | 9.9 | 1:00 | −16.9 | N/A |
| 1:10 | −0.2 | −2.0 | 1:10 | 10.4 | 4.6 | 1:10 | 7.9 | 10.4 | 1:10 | −14.9 | N/A |
| 1:20 | 0.7 | −1.6 | 1:20 | 10.5 | 5.5 | 1:20 | 8.3 | 10.8 | 1:20 | −12.8 | N/A |
| 1:30 | 1.7 | −1.1 | 1:30 | 10.7 | 6.5 | 1:30 | 8.6 | 11.1 | 1:30 | −10.3 | N/A |
| 1:40 | 2.5 | −1.1 | 1:40 | 10.9 | 7.5 | 1:40 | 9.2 | 11.7 | 1:40 | −8.0 | N/A |
| 1:50 | 3.5 | −1.0 | 1:50 | 11.1 | 8.2 | 1:50 | 9.6 | 12.0 | 1:50 | −5.7 | N/A |
| 2:00 | 4.3 | −0.4 | 2:00 | 11.3 | 8.9 | 2:00 | 10.1 | 12.4 | 2:00 | −3.2 | N/A |
| 2:10 | 5.1 | 0.0 | 2:10 | 11.6 | 9.7 | 2:10 | 10.5 | 12.8 | 2:10 | −1.1 | N/A |
| 2:20 | 5.8 | 0.5 | 2:20 | 11.9 | 10.3 | 2:20 | 10.9 | 13.0 | 2:20 | 0.7 | N/A |
| 2:30 | 6.5 | 1.2 | 2:30 | 12.0 | 10.8 | 2:30 | 11.3 | 13.3 | 2:30 | 2.4 | N/A |
| 2:40 | 7.1 | 1.8 | 2:40 | 12.2 | 11.4 | 2:40 | 11.7 | 13.6 | 2:40 | 3.9 | N/A |
| 2:50 | 7.7 | 2.3 | 2:50 | 12.4 | 11.9 | 2:50 | 12.0 | 13.8 | 2:50 | 5.1 | N/A |

TABLE 5

Temperature Change

| BOV Cryogenic Infused | | | Traditional Aerosol: Shaken Vigorously | | | Traditional Aerosol: Shaken Slightly | | | Traditional Aerosol: Not Shaken | | |
|---|---|---|---|---|---|---|---|---|---|---|---|
| Time | Temp (° C.) | | Time | Temp (° C.) | | Time | Temp (° C.) | | Time | Temp (° C.) | |
| (min:sec) | Try 1 | Try 2 | (min:sec) | Try 1 | Try 2 | (min:sec) | Try 1 | Try2 | (min:sec) | *Try 1* | *Try 2* |
| 3:00 | 8.3 | 2.7 | 3:00 | 12.6 | 12.2 | 3:00 | 12.3 | 14.0 | 3:00 | 6.3 | N/A |
| 3:10 | 8.9 | 3.1 | 3:10 | 12.8 | 12.6 | 3:10 | 12.6 | 14.2 | 3:10 | 7.4 | N/A |
| 3:20 | 9.3 | 3.7 | 3:20 | 12.9 | 13.1 | 3:20 | 12.9 | 14.4 | 3:20 | 8.5 | N/A |
| 3:30 | 9.8 | 4.3 | 3:30 | 13.1 | 13.4 | 3:30 | 13.1 | 14.7 | 3:30 | 9.4 | N/A |
| 3:40 | 10.2 | 4.7 | 3:40 | 13.3 | 13.8 | 3:40 | 13.3 | 15.0 | 3:40 | 10.2 | N/A |
| 3:50 | 10.6 | 5.0 | 3:50 | 13.5 | 14.1 | 3:50 | 13.6 | 15.1 | 3:50 | 10.9 | N/A |
| 4:00 | 10.9 | 5.4 | 4:00 | 13.7 | 14.4 | 4:00 | 13.8 | 15.4 | 4:00 | 11.5 | N/A |
| 4:15 | 11.3 | 6.0 | 4:15 | 13.8 | 14.7 | 4:1 | 14.0 | 15.6 | 4:15 | 12.3 | N/A |
| 4:30 | 11.9 | 6.3 | 4:30 | 14.0 | 14.8 | 4:30 | 14.3 | 15.8 | 4:30 | 13.0 | N/A |
| 4:45 | 12.2 | 6.6 | 4:45 | 14.2 | 15.0 | 4:45 | 14.5 | 16.0 | 4:45 | 13.5 | N/A |
| 5:00 | 12.6 | 7.0 | 5:00 | 14.7 | 15.0 | 5:00 | 14.8 | 16.2 | 5:00 | 14.0 | N/A |
| 5:15 | 13.0 | 7.4 | 5:15 | 14.9 | 15.2 | 5:15 | 15.0 | 16.5 | 5:15 | 14.3 | N/A |
| 5:30 | 13.2 | 7.0 | 5:30 | 15.1 | 15.7 | 5:30 | 15.1 | 16.7 | 5:30 | 14.7 | N/A |
| 5:45 | 13.5 | 7.9 | 5:45 | 15.2 | 15.9 | 5:45 | 15.3 | 16.9 | 5:45 | 15.0 | N/A |
| 6:00 | 13.7 | 9.0 | 6:00 | 15.4 | 16.1 | 6:00 | 15.5 | 17.1 | 6:00 | 15.3 | N/A |
| 6:30 | 14.1 | 10.5 | 6:30 | 15.8 | 16.2 | 6:30 | 15.8 | 17.3 | 6:30 | 15.6 | N/A |
| 7:00 | 14.4 | 11.9 | 7:00 | 16.1 | 16.4 | 7:00 | 15.9 | 17.4 | 7:00 | 15.8 | N/A |
| 7:30 | 14.8 | 12.8 | 7:30 | 16.3 | 16.8 | 7:30 | 16.1 | 17.5 | 7:30 | 16.0 | N/A |
| Time to 16° C. (Hr:Min:Sec) | 0:10:20 | 0:12:03 | Time to 16° C. (Hr:Min:Sec) | 0:06:52 | 0:05:53 | Time to 16° C. (Hr:Min:Sec) | 0:07:11 | 0:04:45 | Time to 16° C. (Hr:Min:Sec) | 0:07:30 | *sprayed as liquid and gas with bursts of gel-like foam Straight propellant caused cooling, and the sample stopped working for the second trial. |

Other Embodiments

The foregoing description discloses only exemplary embodiments of the invention.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the appended claims. Thus, while only certain features of the invention have been illustrated and described, many modifications and changes will occur to those skilled in the art. It is therefore to be understood that the appended claims are intended to cover all such modifications and changes as fall within the true spirit of the invention.

What is claimed is:

1. A cryogenic, kinetically active formulation expelled from a pressurized package, the formulation comprises one or more active agents, which one or more active agents in the formulation is mixed at high speed under controlled temperature and pressure with one or more liquid refrigerants prior to being filled under pressure into said package and expelled from said package;
    wherein said one or more liquid refrigerants are added in sufficient amounts to be dispersed in the formulation;
    wherein said pressurized package is under sufficient pressure suitable to maintain the one or more liquid refrigerants dispersed in the formulation; and wherein said pressurized package is under sufficient pressure to expel said formulation as a foamlike, cryogenic, kinetically active formulation upon application of external force on said formulation in said package; wherein said one or more liquid refrigerants are non-flammable liquid refrigerants, wherein the one or more non-flammable liquid refrigerants comprise 1,1,1,3,3-Pentafluoropropane (Honeywell HFC-245FA), and either or both trans-1,3,3,3-Tetrafluoroprop-1-ene (Honeywell Solstice 1234ZE), 1-Chloro-3,3,3-trifluoropropene (Honeywell Solstice 1233ZD), wherein the one or more non-flammable liquid refrigerants are about 40% of the formulation.

2. The formulation of claim 1, wherein at least some of the refrigerants are liquid and the liquid refrigerants are solubilized in the formulation and small micro-pockets of liquid propellants are captured in the formulation.

3. The formulation of claim 1, wherein said formulation is for topical application.

4. The formulation of claim 1, wherein the one or more active agents are pain reduction products or skin tighteners.

5. The formulation of claim 1, wherein the package does not need to be shaken vigorously or at all to expel said formulation as a foamlike, cryogenic, kinetically active formulation upon application of external force on said formulation in said package.

6. The formulation of claim 1, wherein said package is a bag on valve (BOV) pressurized assembly, comprising a two-way fill/dispensing valve, an attached internal high barrier bag affixed to said valve, and rigid container adapted to holding positive pressure affixed to the valve.

7. The formulation of claim 6, wherein said container is glass, barrier resin, metal/alloy, or another material capable of holding positive pressure.

8. The formulation of claim 6, wherein the BOV pressurized assembly expels the formulation in a metered dispensing system.

\* \* \* \* \*